(12) United States Patent
Correa

(10) Patent No.: US 8,968,574 B2
(45) Date of Patent: Mar. 3, 2015

(54) METHOD AND DEVICE FOR THE WET OXIDATION TREATMENT OF LIQUID WASTE LADEN WITH MINERAL MATTER

(75) Inventor: Boris Correa, Lausanne (CH)

(73) Assignee: Granit Technologies S.A., Orbe (CH)

( * ) Notice: Subject to any disclaimer, the term of this patent is extended or adjusted under 35 U.S.C. 154(b) by 625 days.

(21) Appl. No.: 13/257,374

(22) PCT Filed: Mar. 15, 2010

(86) PCT No.: PCT/CH2010/000070
§ 371 (c)(1),
(2), (4) Date: Sep. 19, 2011

(87) PCT Pub. No.: WO2010/108290
PCT Pub. Date: Sep. 30, 2010

(65) Prior Publication Data
US 2012/0006756 A1 Jan. 12, 2012

(30) Foreign Application Priority Data
Mar. 24, 2009 (CH) .................... 00455/09

(51) Int. Cl.
| | | |
|---|---|---|
| C02F 1/02 | (2006.01) | |
| C02F 1/72 | (2006.01) | |
| C02F 1/20 | (2006.01) | |
| C02F 11/08 | (2006.01) | |
| C02F 1/74 | (2006.01) | |
| F28D 7/10 | (2006.01) | |
| F28D 7/14 | (2006.01) | |
| F28D 21/00 | (2006.01) | |

(52) U.S. Cl.
CPC ... *C02F 1/02* (2013.01); *C02F 1/72* (2013.01); *C02F 11/08* (2013.01); *C02F 1/20* (2013.01); *C02F 1/727* (2013.01); *C02F 1/74* (2013.01); *C02F 2209/02* (2013.01); *C02F 2209/03* (2013.01); *C02F 2209/40* (2013.01); *F28D 7/106* (2013.01); *F28D 7/14* (2013.01); *F28D 2021/0019* (2013.01)
USPC ........... 210/742; 210/750; 210/761; 210/766; 422/235; 422/242

(58) Field of Classification Search
CPC .............. C02F 1/02; C02F 1/025; C02F 1/20; C02F 1/72; C02F 1/722; C02F 1/727; C02F 1/74; C02F 1/78; C02F 11/08; C02F 11/083; C02F 11/086; C02F 2209/03; C02F 2209/40; C02F 2209/02; F28D 7/14; F28D 7/106
USPC ........... 210/742, 750, 761, 766; 422/235, 242
See application file for complete search history.

(56) References Cited

U.S. PATENT DOCUMENTS

| | | |
|---|---|---|
| 3,661,778 A | 5/1972 | Pradt |
| 5,183,577 A | 2/1993 | Lehmann |
| 5,417,937 A | 5/1995 | Voigt et al. |
| 2008/0078724 A1 | 4/2008 | Felch et al. |

*Primary Examiner* — Lucas Stelling
(74) *Attorney, Agent, or Firm* — Davis & Bujold, PLLC; Michael J. Bujold

(57) ABSTRACT

A method and device for the wet oxidation treatment of liquid waste laden with mineral matter in suspension. The device comprises a reactor including a treatment column, first and second heat exchangers placed upstream and downstream, respectively, of the reactor. The solution to be treated, laden with mineral matter to which an oxidizing gas has been added, is injected into the reactor for treatment after being preheated in the first heat exchanger. When the solution exits the reactor, the hot treated mixture is divided into two hot stream fragments. The first hot treated mixture stream fragment, the flow rate of which is kept constant by a diaphragm column, is used for controlling the temperature of the first heat exchanger and then discharged after being used in the first heat exchanger. The second hot treated mixture stream fragment is directly cooled and discharged when the second hot treated mixture stream fragment leaves the reactor.

13 Claims, 2 Drawing Sheets

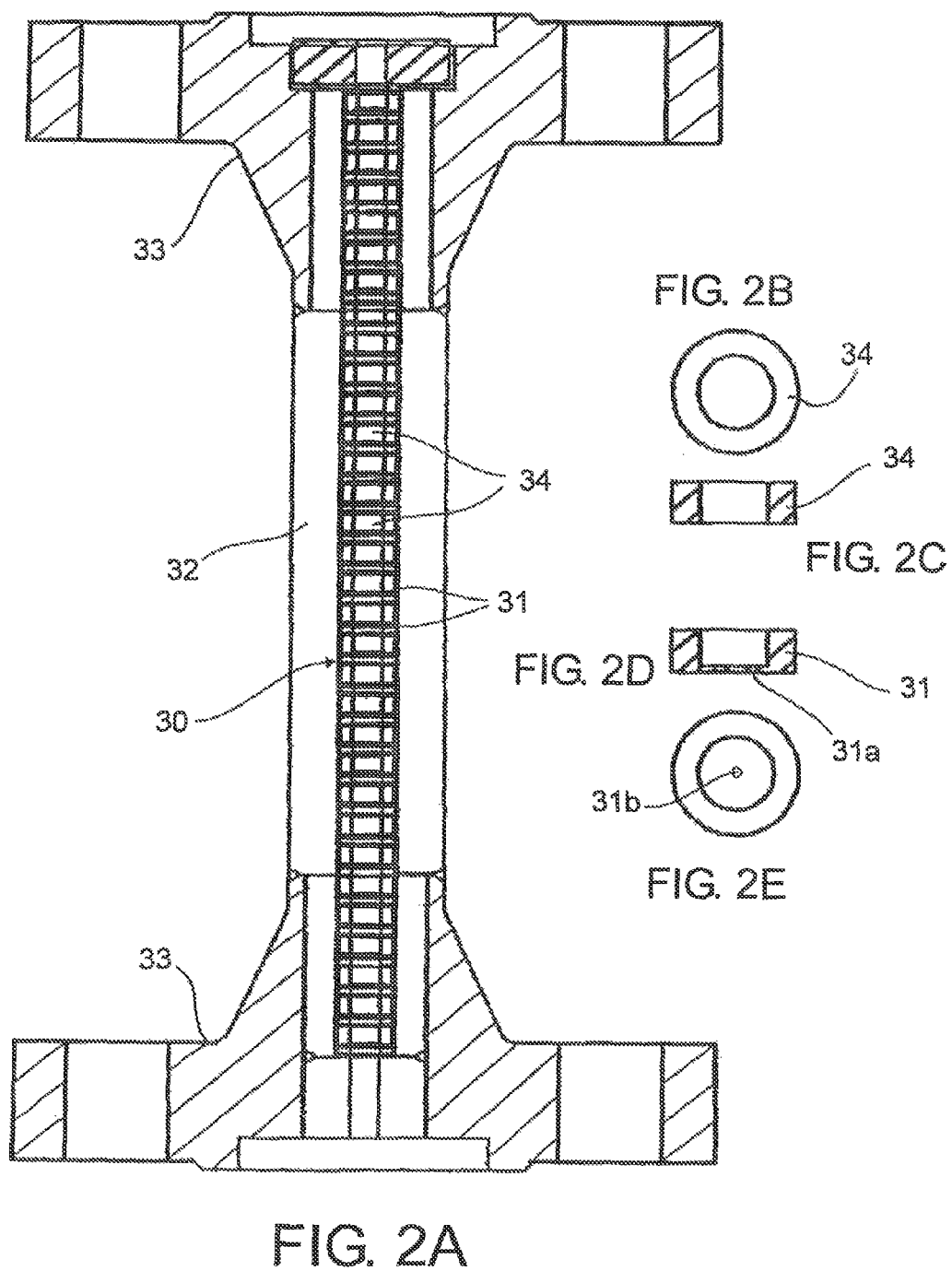

METHOD AND DEVICE FOR THE WET OXIDATION TREATMENT OF LIQUID WASTE LADEN WITH MINERAL MATTER

This application is a National Stage completion of PCT/CH2010/000070 filed Mar. 15, 2010, which claims priority from Swiss patent application serial no. 455/09 filed Mar. 24, 2009.

FIELD OF THE INVENTION

The present invention concerns a method for the wet oxidation treatment of liquid waste laden with mineral matter in which a solution loaded with oxidizable substances is prepared, an oxidizing gas is mixed with the solution, the mixture of solution to be treated and oxidizing gas is preheated in a first heat exchanger, the mixture of solution to be treated and oxidizing gas is heated in a reactor at temperatures sufficient to oxidize the oxidizable substances, the treated mixture is cooled in a second exchanger, and the treatment gases are separated from the residual minerals in the cold treated mixture at the exit from the second heat exchanger before they are respectively discharged.

The invention also concerns a device for implementing this method, the device comprising a means for mixing an oxidizing gas with an oxidizable substance-laden solution to be treated, at least one first heat exchanger for preheating the mixture of solution to be treated and oxidizing gas, at least one reactor for oxidizing the oxidizable substances contained in the solution, at least one second heat exchanger to cool the treated mixture, and a means located at the exit from the second heat exchanger for separating the treatment gases from the residual minerals in the cooled treated mixture before they are respectively discharged.

BACKGROUND OF THE INVENTION

The principle of this method is known in the art, but it is one with various disadvantages that limit its usefulness in industry.

First if all, the method tends to systematically clog up heat exchangers, particularly when the solution to be treated contains a large quantity of ions that may form deposits and/or scale such as, for example, calcium (Ca), magnesium (Mg), silicon (Si), etc., and when the solution contains a high percentage of organic and/or mineral solids in suspension. This clogging results in frequent unpredictable treatment equipment stoppages, leading to lost productivity, reduced output, and significant economic losses. Furthermore, each stoppage necessitates the intervention of an operator/technician to repair and restart the equipment, both day and night, and even on holidays. These interventions are very costly, and restarting equipment after a breakdown caused by clogging requires close surveillance. Finally, this type of breakdown requires complicated, expensive dismantling of the heat exchangers, which must take place in an environment polluted by the presence of chemicals hazardous to the technicians, who are forced to work under particularly difficult, dangerous conditions.

There are currently solutions available to reduce the risk of clogging. These solutions consist of adding adjuvants to prevent deposits from forming in the heat exchangers. However, these solutions, which require the acquisition and addition of adjuvants to control, have the disadvantage of considerably increasing the costs of using treatment installations.

Another solution that has been tried consists of doubling the heat exchanger system, thereby reducing the cost of restarting the system because it does not require preliminary cooling. However, the initial investment is considerably higher because the price of high pressure exchangers is very high. Furthermore, this does not eliminate the problem of dismantling and mechanically and/or chemically cleaning dirty exchangers. For this reason, it is an excessively costly solution that penalizes the user both in terms of the initial investment and the use and maintenance of the systems.

Cost of use is therefore a major determining parameter for current systems. Energy consumption for pressurizing the solution to be treated is especially high, as well as the cost of the oxidizer (99% oxygen or pressurized air). Consumption of cooling liquid is also high. In addition, current systems often require the use of catalyzers, further adding to the cost of use and increasing consumption of oxidizing gas.

U.S. Pat. No. 5,183,577 describes a method for treating recycled water containing inorganic ammonium salts. However, the method of the present invention differs from this method in that:

the reactor is completely filled with liquid and there is no separation of phases in the reactor and thus, no control over the level is required;

the stream of oxidized liquid, which is withdrawn from the reactor to preheat the stream to be treated before it enters the reactor, is constant and previously fixed using diaphragms made of suitable material that is resistant to the stream containing the highly abrasive mineral material;

the temperature for preheating the liquid is regulated by the flow from the upstream pump and not from a downstream valve. This has two advantages: first, it prevents any wear on the valve (no decompression regulation) because regulation takes place under compression (thus no wear or cavitation) and secondly, it reduces exchanger surface to a minimum by the use of a maximum delta T and completely eliminates clogged exchangers through perfect regulation of exchanger temperature (due to compression regulation);

the second stream leaving the reactor is cooled to recoup excess heat and liquid from the reaction and plays no role in regulating the method, which consists, above all, of regulating the temperature at the entrance to the reactor and the pressure at the exit. The object of U.S. Publication 2008/078724 is a system and method for oxidation applications taking place in a wet, catalytic environment, specifically for treating aqueous mud containing a metal and a volatile organic carbon.

U.S. Pat. No. 5,417,937 concerns an apparatus for the wet oxidation of liquids and/or mud contaminated with organic materials comprising a reactor subdivided into several elements, an apparatus which has no phase separation and in which regulation is accomplished using a downstream valve (regulation of a fluid in decompression mode). In the treatment device according to the present invention temperature is regulated by a system that works by fluid compression. Since the liquid's exit is fixed, the flow rate of the system depends on the necessity of maintaining the system in equilibrium by exerting a constant force on the diaphragms through the action of the liquid. To modify the flow, it is necessary to change the diaphragms, which is a difficult mechanical operation that is quite the opposite of regulation.

SUMMARY OF THE INVENTION

The present invention offers a solution to the problems outlined above by proposing a method and device for treating liquid waste by wet oxidation, particularly liquid waste with a high concentration of chemical oxygen demand (COD)

which are only slightly or not at all biodegradable and are highly charged with mineral matter and/or matter in suspension. This simultaneously lowers the initial investment of installing treatment equipment and the expense of use and maintenance, while offering highly effective treatment, a very reliable method and device implementing the method, reduced energy consumption responsive to ecological concerns and economic research, reduced consumption of oxidizing gas, simplified installation and consequently, lower maintenance expense.

To achieve this goal, the method of the invention, as defined in the preamble, is characterized in that the flow of hot treated mixture is divided at the reactor exit into a first stream fragment and a second stream fragment, in that the second stream fragment of hot treated mixture is cooled and evacuated, in that the first hot stream fragment of treated mixture is used to regulate the preheating temperature of the first heat exchanger, in that the first stream fragment is evacuated after being used in the first heat exchanger, and in that a double loop is defined for regulating the temperature in the first temperature exchanger by regulating the flow of cold solution to be treated at the entry to the first heat exchanger as a function of the temperature of the hot solution to be treated upon its exit from the exchanger and as a function of reactor temperature, the reactor temperature determining the temperature of the first hot stream fragment of treated mixture before it is used in the first heat exchanger.

Advantageously, in the first heat exchanger, the flow rate of the first stream fragment of hot treated mixture is kept constant regardless of the flow rate of solution to be treated. Preferably the flow rate of the first stream fragment of hot treated mixture is kept constant by using at least one diaphragm located after the exit for the first cooled stream from the first heat exchanger.

In the preferred embodiment of the method of the invention, the mixture is preheated by bringing it to a temperature generally ranging from 130 to 200° C. This temperature depends on the chemical characteristics of the liquid to be treated. It must be determined experimentally and regulated at a value that remains as constant as possible, at a maximum of +/−10° C.

Next oxidation treatment of the mixture takes place in the reactor at temperatures generally ranging from 260 to 350° C. and at pressure generally ranging from 70 to 200 bars.

The device for treating liquid waste according to the invention as defined in the preamble is characterized in that it further comprises a means for dividing the stream of hot treated mixture at the exit from the reactor into a first stream fragment and a second stream fragment, and a means designed to maintain the flow rate of the first stream fragment of hot treated mixture constant in order to use it for regulating the preheating temperature of the first heat exchanger.

According to a preferred embodiment, the means for maintaining the flow rate of the first stream of hot treatment mixture steady comprises at least one diaphragm located after the exit for the first cooled stream from the first heat exchanger.

In the preferred embodiment of the device, the means for maintaining the flow rate of the first stream of hot treatment mixture steady comprises several diaphragms disposed in a column and separated in pairs by struts.

Preferably each of the diaphragms consists of a cylindrical piece comprising a base equipped with a calibrated opening and each of the struts consists of a cylindrical piece having essentially the same dimensions as the diaphragms.

Advantageously, the first heat exchanger comprises an interior circuit and a peripheral circuit, the interior circuit in the first heat exchanger being traversed by the mixture of solution to be treated and oxidizing gas, and the peripheral circuit being traversed by the first stream fragment of hot treated mixture divided at the reactor exit.

The second heat exchanger also comprises an interior circuit and a peripheral circuit, the interior circuit in the second heat exchanger being traversed by the second stream fragment of hot treated mixture divided at the exit from the reactor and the peripheral circuit being traversed by a cooling liquid.

In the preferred form of embodiment, the means disposed at the exit from the second heat exchanger designed to separate the treatment gases from the residual minerals in the cooled, treated mixture consists of a degasser.

BRIEF DESCRIPTION OF THE DRAWINGS

The present invention and its features will be more readily apparent from the following description of one embodiment given by way of non-limiting example, with reference to the attached drawings in which:

FIGS. 2A, 2B, 2C, 2D and 2E are vertical and transverse cross-sections representing a type of diaphragm embodiment for controlling the flow of the first stream fragment.

DETAILED DESCRIPTION OF THE PREFERRED EMBODIMENTS

Figure 1:
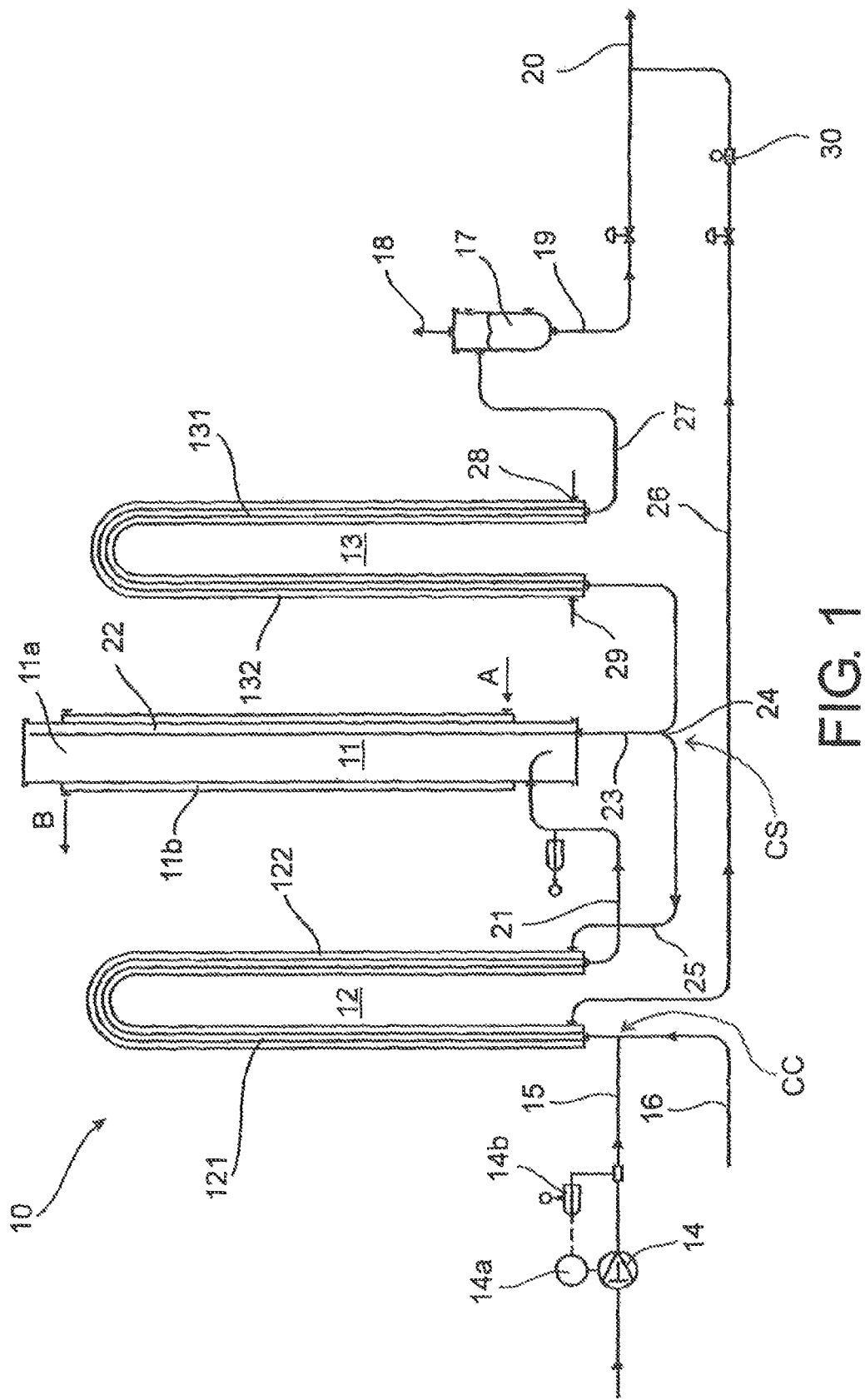
FIG. 1 is a general schematic view of the device according to the invention.

With reference to FIG. 1, device 10 for wet oxidation treatment of liquid waste principally comprises at least one reactor 11 consisting of a treatment column, at least one first heat exchanger 12 located upstream of the treatment column, and at least one second heat exchanger 13 located downstream of the treatment column. The treatment column advantageously consists of a vertical cylindrical surround 11a into which the solution to be treated, containing the mineral materials, is injected, the surround being enveloped by a peripheral mantle 11b designed to maintain the surround and its contents at the treatment temperatures determined to ensure oxidation reactions according to the wet oxidation method. For this purpose the mantle may be in the form of a hollow envelope, for example, through which there circulates a heat-transfer fluid that has been injected at the base in the direction of arrow A and which is collected at the top in the direction of arrow B.

The first heat exchanger 12, called the preheating exchanger, functions to preheat the solution to be treated and maintain temperature constant between the extreme values in order to prevent formation of deposits that might clog the exchanger.

Device 10 further comprises a pump 14 to control the incoming solution to be treated, the pump being driven by a motor 14a controlled by a control and regulation unit 14b, and a means for injecting into a conduit 15 that conveys the solution upstream of the entry to the first heat exchanger 12, a pressurized oxidizing gas at a controlled temperature, such as pressurized air or oxygen, into a conduit 16 connected to conduit 15 (e.g., a conduit combiner CC).

Finally, device 10 comprises a degasser 17 located downstream of second heat exchanger 13 and which is designed to discharge the gases resulting from the treatment procedure through an upper exit 18 to a gas treatment unit (not shown) and to evacuate the mineral residue from which all organic substances oxidized during treatment have been removed, for example at a lower exit 19 through a conduit 20 to a biological waste management unit (not shown).

Heat exchangers 12 and 13 are shown as upside down U-shaped elements having two vertical branches. First heat exchanger 12 comprises an interior circuit 121 and a peripheral circuit 122. Second heat exchanger 13 also comprises an interior circuit 131 and a peripheral circuit 132. Interior circuit 121 of first heat exchanger 12 is fed through conduits 15 and 16, respectively conveying the solution to be treated and the oxidizing gas. This mixture traverses the first heat exchanger 12 and penetrates conduit 21 to be injected at the base of vertical cylindrical surround 11a on the treatment column of reactor 11. The mixture treated by oxidation inside this treatment column is trapped in the upper portion by a vertical channel 22 attached inside vertical cylindrical surround 11a, opening into an exterior conduit 23 leading to the point 24 (e.g., a conduit splitter CS) where the streams are split.

A first portion of the stream of hot treated mixture is used in first exchanger 12 and for this reason, it is injected through a conduit 25 into peripheral circuit 121 of the first heat exchanger 12 before being discharged after use through exit conduit 26 toward the biological waste management unit, through conduit 20. A second portion of the stream divided at stream division point 24 is injected into interior circuit 132 of the second heat exchanger 13, which it leaves after cooling, through conduit 27 and into degasser 17 referenced above.

Second heat exchanger 13 further comprises an inlet 28 for cooling liquid that is connected to peripheral circuit 132 at the base of one of the vertical branches of the exchanger 13 and an outlet 29 for the cooling liquid located at the base of the other vertical branch of the heat exchanger 13.

FIGS. 2A through 2E show longitudinal and transverse cross sections of a column 30 of diaphragms 31 that regulates the first stream of cooled treated mixture as it exits from first heat exchanger 12, allowing adjustment for pressure loss in order to maintain a steady flow. The column is located inside a support 32 having two attaching flasks 33 at its extremities. Column 30 is composed of a series of diaphragms 31, pairs of which are separated by struts 34. A plane view of one strut 34 is shown by FIG. 2B and a transverse cross-section by FIG. 2C. These struts consist of a cylindrical piece that serves to define a predetermined space between the diaphragms. Diaphragms 31, such as those shown in transverse cross-section in FIG. 2D and in plane view by FIG. 2E, also have a generally cylindrical profile with the same dimensions as struts 34. However, they have a closed base 31a equipped with a calibrated opening 31b to define the flow of the stream passing through it. This device regulates flow according to the number of diaphragms 31 attached inside column 30 and according to the section of calibrated openings 31b.

In operational mode, the device described above ensures strict regulation of temperature in the preheating exchanger or exchangers, depending upon the construction, based on the principle of dividing the streams at the reactor exit, thereby eliminating the formation of deposits. The formation of deposits, which requires dismantling and unclogging of the preheating exchanger in existing installations, occurs when temperatures exceed limits ranging essentially from 130 to 200° C. and in particular, above 200° C. Regulating the temperature in preheating exchanger 12 is accomplished by regulating the flow of cold effluent by dividing the streams at the reactor outlet. In known installations, regulating the preheating temperature is done using the hot effluent, with a poorly controlled outcome that causes serious deposit formation in the exchanger.

In practice, this temperature regulation takes place in the following way:

The stream of hot treated mixture is divided into two stream fragments at the reactor outlet;

The first stream fragment is directed toward the first heat exchanger, called the preheating exchanger, and the second stream fragment toward the second heat exchanger, called the cooling exchanger;

Dividing the stream is done in a certain way and at a reaction pressure within the reactor such that the flow of the first stream fragment remains constant regardless of the flow of solution to be treated. This division is obtained by using at least one and preferably a series of diaphragms (see FIG. 2) installed after the exit for the first cooled stream from the preheating exchanger. This system permits adjustment for pressure loss to keep the flow constant, with the consequence that any excess liquid is evacuated toward the cooling exchanger. The individual pressure loss in each diaphragm when the device comprises a series of diaphragms is slight, on the order of 1 to 8 bars. Constructing these diaphragms is simple, as it entails cylinders comprising a turbulence chamber and having calibrated openings for liquid discharge, with the number and dimensions of these cylinders defined according to the desired operating pressure and flow rates.

This operation therefore defines a double loop for temperature regulation in the first temperature exchanger, since the flow of cold solution to be treated is regulated at the entry to the first heat exchanger as a function of the temperature of hot solution to be treated upon its exit from the exchanger and as a function of reactor temperature, the reactor temperature determining the temperature of the first stream fragment of hot treated mixture before it is used in the first heat exchanger.

It should be understood that many varied embodiments are possible. Although the device is shown schematically with a single first preheating exchanger and a single second cooling exchanger, in very large installation, several preheating exchangers could be installed, for example. The shape of the elements could be varied according to specific requirements for a treatment unit and the outcomes sought when treating a particular composition of waste. The variations conceived do not exceed the scope of modifications that are obvious to a person skilled in the art and are integrated into the realm of the present invention.

The invention claimed is:

1. A method for wet oxidation treatment of liquid waste laden with mineral matter, in which a solution to be treated laden with oxidizable substances is prepared, an oxidizing gas is mixed with the solution, the mixture of solution to be treated and oxidizing gas is preheated in a first heat exchanger, the mixture of solution to be treated and oxidizing gas is heated in a reactor to temperatures sufficient to oxidize the oxidizable substances, the treated mixture is cooled in a second heat exchanger and, at an exit of the second heat exchanger, treatment gases are separated from residual minerals in the cold treated mixture before respective discharge thereof, the method comprising the steps of:

dividing a stream of the hot treated mixture, at an exit from the reactor, into a first stream fragment and a second stream fragment;

cooling and discharging the second stream fragment of the hot treated mixture;

using the first stream fragment of the hot treated mixture to regulate a preheating temperature of the first heat exchanger;

maintaining a constant flow rate of the first stream fragment of the hot treated mixture, in the first heat exchanger, regardless of a flow rate of the solution to be treated by using at least one diaphragm, located after an exit of the first hot stream fragment from the first heat exchanger;

discharging the first stream fragment in the first heat exchanger;

regulating the temperature of the first heat exchanger by controlling a flow of cold solution, to be treated at an entry to the first heat exchanger, as a function of the temperature of the hot solution to be treated at its exit from the first exchanger and as a function of a reactor temperature, the reactor temperature determining the temperature of the first stream fragment of the hot treated mixture before the first stream fragment is used to preheat the mixture of solution in the first heat exchanger.

2. The method according to claim 1, further comprising the step of preheating the mixture of solution to be treated and oxidizing gas to a temperature generally in a range from 130 to 200° C.

3. The method according to claim 1, further comprising the step of conducting oxidation treatment in the reactor at temperatures in a range generally from 260 to 350° C.

4. The method according to claim 1, further comprising the step of conducting oxidation treatment of the mixture under pressure generally in a range from 70 to 200 bars.

5. The method according to claim 1, further comprising the step of conveying both the mineral residue, evacuated from the degasser (17), and the first stream fragment, following passage through the at least one diaphragm (31), to a biological waste management unit.

6. A wet oxidation treatment device (10) for liquid waste laden with mineral materials, the device comprising:

a conduit combiner, for mixing an oxidizing gas with a solution to be treated that is laden with oxidizable substances;

at least a first heat exchanger (12) for preheating the mixture of solution to be treated and oxidizing gas;

at least one reactor (11) for oxidizing the oxidizable substances contained in the mixture of solution to be treated and oxidizing gas, at least a second heat exchanger (13) for cooling the treated mixture, and a degasser located at an exit from the second heat exchanger (13) for separating treatment gases from mineral residues in the cooled treated mixture before respective discharge thereof;

a conduit splitter for dividing the stream of the hot treated mixture, at an exit from the reactor (11), into a first stream fragment and a second stream fragment;

at least one diaphragm (31) being located after an exit of the first hot stream fragment from the first heat exchanger (12), the at least one diaphragm (31) being designed for maintaining a steady flow of the first stream fragment of the hot treated mixture in order to regulate a preheating temperature of the first heat exchanger (12); and the at least one diaphragm (31) regulating the flow of cold solution to be treated at an entry to the first heat exchanger as a function of the reactor temperature, the reactor temperature determining the temperature of the first stream fragment of the hot treated mixture before the hot treated mixture is used in the first heat exchanger (12).

7. The wet oxidation treatment device according to claim 6, wherein the device comprises several diaphragms (31) located in a column (30) and separated in pairs by struts (34).

8. The wet oxidation treatment device according to claim 7, wherein each of the diaphragms (31) comprises a cylindrical piece comprising a base (31a) equipped with a calibrated opening (31b).

9. The wet oxidation treatment device according to claim 7, wherein the each of the struts (34) comprises a cylindrical piece with substantially identical dimensions as the diaphragms (31).

10. The wet oxidation treatment device according to claim 6, wherein the first heat exchanger (12) comprises an interior circuit (123) and a peripheral circuit (124), the interior circuit (123) in the first heat exchanger is traversed by the mixture of solution to be treated and the oxidizing gas, and the peripheral circuit (124) is traversed by the first stream fragment of the hot treated mixture which is divided at the exit from the reactor (11).

11. The wet oxidation treatment device according to claim 6, wherein the second heat exchanger (13) comprises an interior circuit (133) and a peripheral circuit (134), the interior circuit (133) in the second heat exchanger is traversed by the second stream fragment of the hot treated mixture which is divided at the exit from the reactor (11), and the peripheral circuit (134) is traversed by a cooling liquid.

12. The wet oxidation treatment device according to claim 6, wherein the degasser (17) is located downstream of the second heat exchanger (13) for discharging gases through an upper exit (18) to a gas treatment unit and evacuating the mineral residue to a biological waste management unit.

13. The wet oxidation treatment device according to claim 6, wherein the mineral residue, evacuated from the degasser (17), and the first stream fragment, after passing through the at least one diaphragm (31), are both conveyed to a biological waste management unit.

* * * * *